United States Patent
Ginter et al.

(10) Patent No.: US 9,987,612 B1
(45) Date of Patent: Jun. 5, 2018

(54) REACTOR ASSEMBLY

(71) Applicant: Caterpillar Inc., Peoria, IL (US)

(72) Inventors: David Mark Ginter, Peoria, IL (US); Ling Deng, Dunlap, IL (US); Wilce Damion Williams, Peoria, IL (US); Ronald G. Silver, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days. days.

(21) Appl. No.: 15/486,411

(22) Filed: Apr. 13, 2017

(51) Int. Cl.
*B01J 19/24* (2006.01)
*C01B 3/40* (2006.01)
*C01B 3/38* (2006.01)

(52) U.S. Cl.
CPC .......... *B01J 19/2485* (2013.01); *B01J 19/24* (2013.01); *B01J 19/2475* (2013.01); *C01B 3/382* (2013.01); *C01B 3/40* (2013.01); *B01J 2219/24* (2013.01); *B01J 2219/2423* (2013.01); *B01J 2219/2428* (2013.01); *C01B 2203/0233* (2013.01); *C01B 2203/0261* (2013.01); *C01B 2203/1023* (2013.01); *C01B 2203/1064* (2013.01)

(58) Field of Classification Search
CPC ................ B01J 19/2485; B01J 19/2423; B01J 2219/2423; B01J 2219/2428; C01B 3/40; C01B 3/382; C01B 3/386; C01B 2203/0233; C01B 2203/0261; C01B 2203/1023
See application file for complete search history.

(56) References Cited

U.S. PATENT DOCUMENTS

| 5,511,972 | A | 4/1996 | Dalla Betta et al. |
| 6,187,066 | B1 | 2/2001 | Benz et al. |
| 6,436,363 | B1 * | 8/2002 | Hwang ............... B01J 23/40 252/373 |
| 6,488,907 | B1 | 12/2002 | Barnes et al. |
| 6,602,483 | B2 | 8/2003 | Heyse et al. |
| 2008/0008634 | A1 * | 1/2008 | Fischer ............... B01J 15/005 422/600 |
| 2013/0152785 | A1 | 6/2013 | Saukaitis |
| 2014/0219884 | A1 | 8/2014 | Kelly et al. |

FOREIGN PATENT DOCUMENTS

| CA | 2455037 | 4/2004 |
| EP | 2527046 | 11/2012 |
| WO | 2012110781 | 8/2012 |

* cited by examiner

*Primary Examiner* — Lessanework Seifu

(57) ABSTRACT

A reactor assembly is provided. The reactor assembly includes a substrate and a first catalytic layer provided on the substrate. The first catalytic layer further includes a first temperature zone configured to operate at a first temperature. The first catalytic layer further includes a second temperature zone extending from the first temperature zone. The second temperature zone is configured to operate at a second temperature. The second temperature is lower than the first temperature. The reactor assembly also includes a diffusion barrier coating provided on the first catalytic layer. The diffusion barrier coating is configured to regulate a diffusion of gas phase oxygen therethrough for controlling the first temperature with respect to the second temperature.

10 Claims, 2 Drawing Sheets

US 9,987,612 B1

REACTOR ASSEMBLY

TECHNICAL FIELD

The present disclosure relates to a reactor assembly and more particularly to a partial oxidation reformer catalyst.

BACKGROUND

A lean burn engine includes an autothermal reactor which receives a hydrocarbon feed from which a hydrogen-rich gas is to be generated together with air (or an oxygen-containing gas) and steam. The hydrocarbon feed may be preheated to a temperature of about 200 to about 900° C. and is fed into the autothermal reactor which is typically maintained at a temperature of about 250 to about 1100° C.

The autothermal reactor contains a layered catalyst member which initiates and sustains both catalytic partial oxidation and steam reforming reactions. The hydrocarbon feed may consist of $C_5$ and heavier hydrocarbons, but is preferably a normally gaseous or readily vaporizable hydrocarbon such as a $C_1$-$C_4$ alkane, e.g., methane, propane, butane, etc. The amounts of the hydrocarbon feed, steam, and air introduced into the autothermal reactor may further be controlled by other components in the system.

During operation, the autothermal reactor may get relatively hotter at an inlet face thereof due to net exothermic reactions (i.e., combustion) exceeding net endothermic reactions (i.e., steam reforming). Further, sometimes the inlet stream may contain sulfur. In this case, the high temperatures at the inlet face may be exacerbated in the presence of sulfur, as sulfur suppresses the combustion reaction less than the steam reforming reactions. Due to this difference in temperature along a length of the autothermal reactor, the life of the autothermal reactor may be affected since the catalyst at the inlet face of the autothermal reactor may age relatively quickly.

U.S. Pat. No. 5,511,972 describes a partial combustion process in which the fuel is partially combusted using specific catalysts and catalytic structures and also a catalyst structure for use in the process. The catalyst structure is stable due to its comparatively low operating temperature, has a low temperature at which catalytic combustion begins, and yet is not susceptible to temperature "runaway". The combustion gas produced by the catalytic process typically is below the autocombustive temperature for the gas mixture; the gas may be used at that temperature, or fed to other combustion stages for ultimate use in a gas turbine, furnace, boiler, or the like.

SUMMARY OF THE DISCLOSURE

In one aspect of the present disclosure, a reactor assembly is provided. The reactor assembly includes a substrate and a first catalytic layer provided on the substrate. The first catalytic layer further includes a first temperature zone configured to operate at a first temperature. The first catalytic layer further includes a second temperature zone extending from the first temperature zone. The second temperature zone is configured to operate at a second temperature. The second temperature is lower than the first temperature. The reactor assembly also includes a diffusion barrier coating provided on the first catalytic layer. The diffusion barrier coating is configured to regulate a diffusion of gas phase oxygen therethrough for controlling the first temperature with respect to the second temperature.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
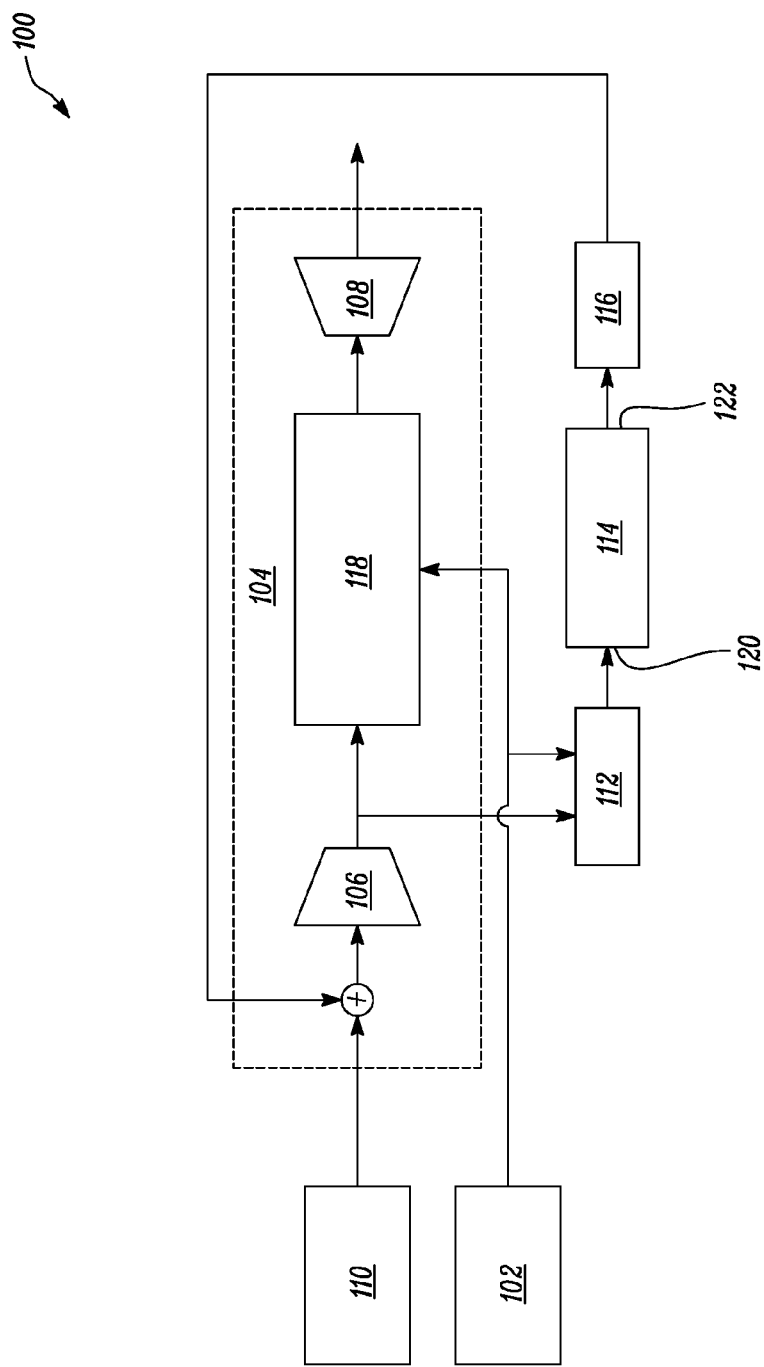
FIG. 1 is a block diagram of an engine and a reactor assembly connected thereto, according to various concepts of the present disclosure.

FIG. 1 illustrates an exemplary system 100 for controlling a reactor assembly to reform a fuel for an engine. By implementing feedback control of the reactor assembly based on nitrogen oxides (NOx) emissions and performance of the engine, the system 100 may produce an appropriate amount of reformed fuel for reducing the NOx emissions of the engine. Referring to FIG. 1, the system 100 includes a fuel supply 102 connected to an engine 104.

The fuel supply 102 supplies a combustible fuel used by the engine 104 to produce power. An exemplary fuel may include natural gas. However, other types of fuel, such as landfill gas or digester gas, may be used as well. Moreover, the fuel may be a mixture of natural gas, landfill gas, digester gas, propane, bio-gas, H2, and/or another fuel. Due to the diversification of fuel sources, the quality and/or composition of the fuel may change frequently. The engine 104 includes a compressor 106 and a turbocharger 108. An air supply 110 is connected to the compressor 106 and is configured to introduce air into the compressor 106.

Referring to FIG. 1, in exemplary operations, the air and the fuel may be delivered to the engine 104, and mixed into a lean air-fuel mixture by a fuel system (not shown) before being ignited by a spark plug (not shown). To improve thermal efficiency and combustion stability of the lean air-fuel mixture, the fuel may be enriched with H2 before being mixed with the air. As shown in FIG. 1, at least a portion of the fuel from the fuel supply 102, together with the air from the air supply 110, may be diverted to a mixer 112 and further introduced into a reactor assembly 114.

The reactor assembly 114 may be configured to reform the diverted fuel to produce H2 enriched fuel using any method known in the art, such as partial oxidation, steam reforming, etc. For example, the reactor assembly 114 includes a suitable catalyst for performing a catalytic partial oxidation (CPOx) process. The reactor assembly 114 may perform the CPOx process to reform the diverted fuel to a H2-rich gas, i.e., a syngas mainly comprising H2, CO, CO2, and H2O. The syngas may then be mixed with the rest of the unreformed fuel and supplied to engine 104.

In exemplary embodiments, the reactor assembly 114 may be controlled by an engine control module (ECM), which also controls the engine 104. The system 100 may additionally include other components or sub-assemblies, for example, one or more engine sensors, valves, fuel and reformate quality sensors, and controllers not described herein.

The syngas is then introduced into a cooler 116 positioned downstream of the reactor assembly 114. The cooler 116 may include any known in the art heat exchanger. Further, the syngas generated by the reactor assembly 114 may be mixed with the unreformed fuel and/or air before being injected into the engine 104. In the following description, the term "fuel," when used alone, may refer to a mixture of the unreformed fuel and the syngas.

The engine 104 may be, for example, a four-stroke reciprocating internal combustion engine that is controlled by the ECM. One skilled in the art will recognize, however, that the engine 104 may alternatively be a two-stroke engine, if desired. The engine 104 may include an engine block that at least partially defines one or more cylinders 118. The cylinders 118, piston, and cylinder head may together define a combustion chamber. The engine 104 may include any number of combustion chambers disposed in an "in-line" configuration, in a "V" configuration, in an opposing-piston configuration, or in any other suitable configuration.

Generally, the concentration of H2 in the fuel determines the thermal efficiency and combustion stability of the lean mixture of air and fuel, and therefore may determine the NOx emission level of the engine 104. In exemplary embodiments, to produce the amount of H2 necessary for maintaining a low NOx emission level, the ECM may use a feedback mechanism to control the reactor assembly 114 based on the real-time NOx emissions of the engine 104, which may be measured by one or more engine sensors mounted on the engine 104.

The present disclosure relates to the reactor assembly 114. The reactor assembly 114 is positioned downstream of the mixer 112 and is configured to receive the inlet stream containing hydrocarbons, steam, and air therethrough. The inlet stream may be pre-heated to a temperature of approximately between 200 to and 900° C. and is fed into the reactor assembly 114. The reactor assembly 114 may be maintained at a temperature of approximately 250 to about 1100° C. A person of ordinary skill in the art will appreciate that the inlet stream is contacted with the reactor assembly 114 at a temperature sufficient to initiate and sustain both catalytic partial oxidation and steam reforming reactions.

Figure 2:
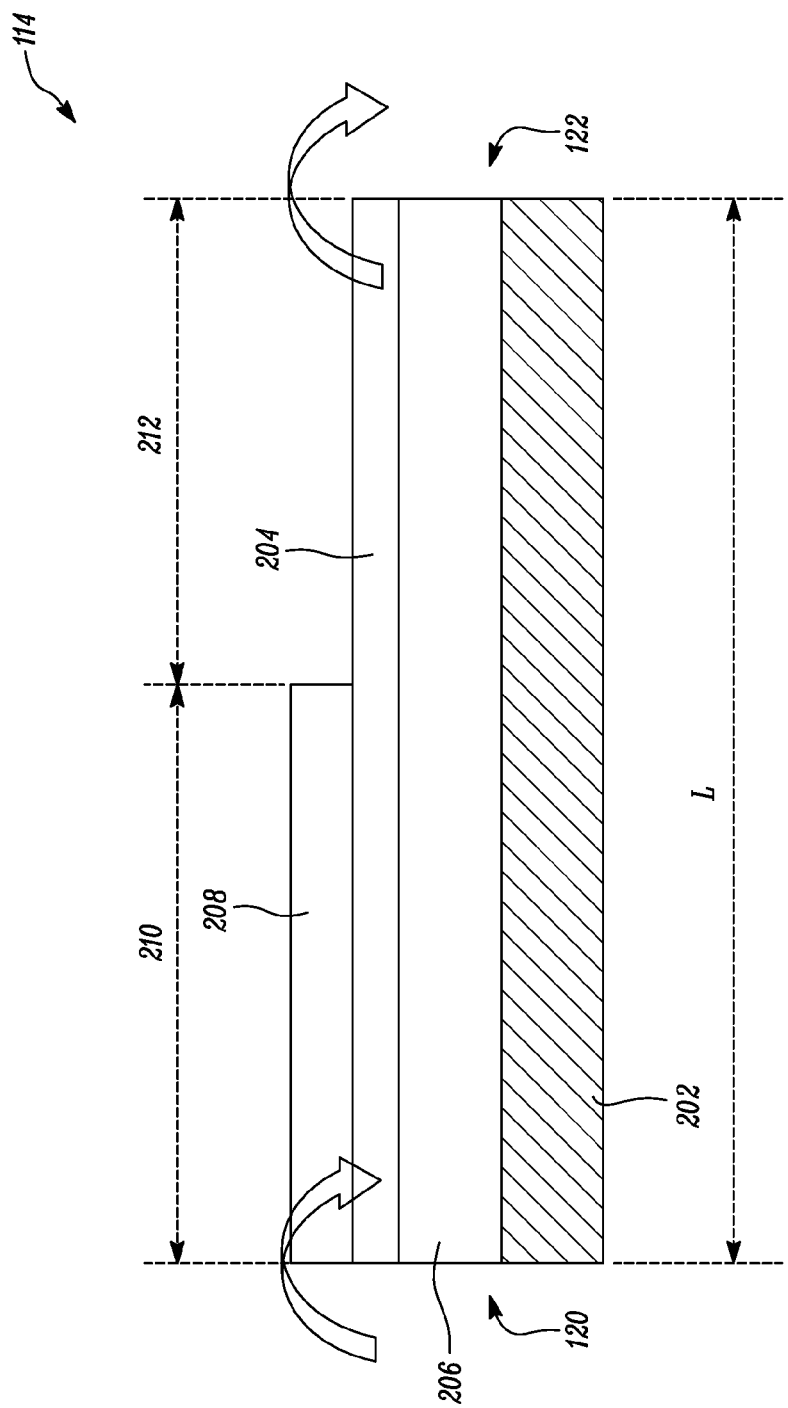
FIG. 2 is a schematic view of the reactor assembly of FIG. 1, according to various concepts of the present disclosure.

Referring to FIG. 2, the reactor assembly 114 includes a substrate 202. A first catalytic layer, hereinafter referred to as a catalytic partial oxidation (CPO) catalyst layer 204 and a second catalytic layer, hereinafter referred to as a steam reformer (SR) catalyst layer 206 are disposed on the substrate 202. The SR catalyst layer 206 is disposed in contact and above the substrate 202 and the CPO catalyst layer 204 is disposed above and in contact with the SR catalyst layer 206. Hence, the substrate 202 has a multi-layer catalyst structure, with the SR catalyst layer 206 being positioned between the CPO catalyst layer 204 and the substrate 202. In other embodiments, the substrate 202 may be provided with a single catalyst layer that may perform both the catalytic partial oxidation and the steam reforming reactions. Further, a diffusion barrier coating 208 is applied on the CPO catalyst layer 204 and will be explained in greater detail later in this section.

The substrate 202 may include a monolith substrate. Either the CPO catalyst layer 204 or the SR catalyst layer 206 or both the CPO and SR catalyst layers 204, 206 may be disposed on a surface of the substrate 202, provided that the CPO catalyst layer 204 is in contact with the SR catalyst layer 206. It should also be understood that the reactor assembly 114 may also comprise multiple SR catalyst layers 206 and/or multiple CPO catalyst layers 204, with each such layer comprising a different SR catalyst composition and/or a different CPO catalyst composition respectively. The CPO and SR catalyst layers 204, 206 are present along an entire length L of the reactor assembly 114.

Alternatively, the SR catalyst layer 206 and CPO catalyst layer 204 are "zoned" or "graduated" and disposed in the same plane of the substrate 202 such that the SR and CPO catalyst layers 206, 204 are in overlapping contact with each other. The thickness and concentration of the catalysts in each of the SR and CPO catalyst layers 206, 204 respectively may vary based on the requirements of the system.

Referring to FIG. 2, the CPO catalyst layer 204 and/or the SR catalyst layer 206 are disposed on the surface of the substrate 202. The substrate 202 may include one or more monolithic bodies having a plurality of finely divided gas flow passages extending therethrough. Such substrates 202 are often referred to as "honeycomb" type substrates and are well known in the art. Typically, a material is selected for use as the substrate 202 which exhibits a low thermal coefficient of expansion, good thermal shock resistance and preferably low thermal conductivity. The substrate 202 may be made of one or more metal oxides, e.g., alumina, alumina-silica, alumina-silica-titania, mullite, cordierite, zirconia, zirconia-ceria, zirconia-spinel, zirconia-mullite, siliconcarbide, etc.

The shape, size, and other dimensions of the substrate 202 may vary. For example, the substrate 202 may have a plurality of parallel gas flow passages of regular polygonal cross sectional extending therethrough from an inlet face 120 to an outlet face 122 of the reactor assembly 114. In other embodiments, the substrate 202 may be made of a heat and oxidation-resistant metal, such as stainless steel or an iron-chromium alloy. Alternatively, the substrate 202 may also be present in the form of a ceramic or metal foam.

A person of ordinary skill in the art will appreciate that the CPO catalyst layer 204 is capable of operating effectively and without significant temperature degradation over a temperature range of about 400 to 1050° C. The CPO catalyst layer 204 should operate effectively in the presence of carbon monoxide, olefins, aromatic hydrocarbons and sulfur compounds. The CPO catalyst layer 204 may comprise one or more "platinum group" metal components which have been found to satisfy the requirements stated above. For example, the CPO catalyst layer 204 may be made of platinum, palladium, rhodium, iridium, osmium, ruthenium and mixtures thereof. In other embodiments, the CPO catalyst layer 204 may be a dispersed rhodium containing catalyst layer.

The SR catalyst layer 206 may comprise any of the catalytic metal components known for steam reforming purposes, e.g., nickel, cobalt and mixtures thereof. The SR catalyst layer 206 may include a platinum group metal component such as platinum, palladium, rhodium, iridium, osmium, ruthenium and mixtures thereof.

The SR and CPO catalyst layers 206, 204 are present in the form of washcoats which are "painted" on the surface of the substrate 202. Such washcoats may comprise alumina which has been impregnated with the SR catalyst and the CPO catalyst respectively. The washcoats of the SR and CPO catalyst layers 206, 204 may include a base washcoast and an active component known in the art.

The present disclosure relates to the diffusion barrier coating 208 that is disposed proximate to the inlet face 120 of the reactor assembly 114. The diffusion barrier coating 208 is deposited on top of or overlying the CPO catalyst layer 204. The diffusion barrier coating 208 controls a rate at which gas phase oxygen is supplied to the underlying CPO catalyst layer 204 of the reactor assembly 114. More particularly, the diffusion barrier coating 208 is applied over the CPO catalyst layer 204 to limit the rate at which the gas phase oxygen present in the inlet stream diffuses into the CPO catalyst layer 204 and, therefore, limits the combustion rate, controlling a temperature of at least a portion of the reactor assembly 114.

The diffusion barrier coating 208 may be provided along at least a portion of the overall length L of the reactor assembly 114. In some embodiments, the diffusion barrier coating 208 is provided along approximately between one third and half of the overall length L of the reactor assembly 114. In other embodiments, the diffusion barrier coating 208 is provided along half of the length L of the reactor assembly 114 and is proximate to the inlet face 120 of the reactor assembly 114 such that the inlet stream first contacts the diffusion barrier coating 208 before contacting the CPO catalyst layer 204 of the reactor assembly 114. In yet other embodiments, the diffusion barrier coating 208 is provided along the entire length L of the reactor assembly 114.

The diffusion barrier coating 208 may be applied as a washcoat on the portion of the CPO catalyst layer 204, such that the diffusion barrier coating 208 overlies the CPO catalyst layer 204. The diffusion barrier coating 208 includes a base washcoat layer. The diffusion barrier coating 208 may include a ceramic porous layer. The diffusion barrier coating 208 may include alumina, silica, zirconia, titania, or a variety of other oxides with a low catalytic activity for oxidation of the fuel. The diffusion barrier coating 208 may range in thickness from 20% to 150% of a thickness of the CPO and/or SR catalyst layers 204, 206. The preferred thickness of the diffusion barrier coating 208 may depend on the operating conditions of the system, including the fuel type, the gas flow velocity, the preheat temperature, and so on.

During operation, the inlet stream from the mixer 112 flows towards the reactor assembly 114. The inlet stream, as described above, includes hydrocarbons, steam, and air. In some situations, the inlet stream may also include sulfur. The reactor assembly 114 is positioned such that the inlet stream flows over and through the reactor assembly 114 and initially contacts the diffusion barrier coating 208 provided on top and in contact with the CPO catalyst layer 204. The reactor assembly 114 is configured to perform catalytic partial oxidation and stream reforming reactions, resulting in generation of hydrogen-rich gases (frequently referred to as "synthesis gas" or "syn gas") exiting the reactor assembly 114 at the outlet face 122.

Due to the net combustion reactions exceeding the net endothermic reactions, the reactor assembly 114 may include a different temperature zones defined by operating temperatures in the given zone. The reactor assembly 114 may include first temperature zone 210 proximate to the inlet face 120 of the reactor assembly 114 and a second temperature zone 212 extending from the first temperature zone 210 and proximate to the outlet face 122 of the reactor assembly 114. The first temperature zone 210 may generally operate at a first temperature that lies approximately between 600 and 1000° C. The second temperature zone 212 proximate to the outlet face 122 of the reactor assembly 114 may generally operate at a second temperature that lies approximately between 300 and 700° C. Further, in the presence of sulfur in the inlet stream, depending on the concentration of sulfur in the inlet stream, the temperature difference between the first and second temperature zones 210, 212 may lie approximately between 200 and 600° C. In some embodiments, the first temperature zone 210 may lie proximate to the inlet face 120, such that the first temperature zone 210 may cover approximately half of the total length L of the reactor assembly 114, while a remaining length of the reactor assembly 114 may include the second temperature zone 212.

The diffusion barrier coating 208 may accordingly be applied such that the diffusion barrier coating 208 lies in the first temperature zone 210 of the reactor assembly 114 and is on top of and in contact with the CPO catalyst layer 204. The diffusion barrier coating 208 controls and regulates the rate of diffusion of the gas phase oxygen present in the inlet stream towards the underlying CPO catalyst layer 204. The presence of the diffusion barrier coating 208 slows the rate of the catalytic partial oxidation reaction and thereby controls the first temperature of the reactor assembly 114 with respect to the second temperature. By controlling the rate at which the gas phase oxygen is supplied to the underlying CPO catalyst layer 204, the diffusion barrier coating 208 will slow the combustion reaction rate without affecting the heat transfer, lowering the first temperature with respect to the second temperature and driving more uniform use of the feed oxygen along the length L of the reactor assembly 114.

The inlet stream enters the reactor assembly 114 and passes through the diffusion barrier coating 208. Further, the catalytic partial oxidation and the steam reforming reactions take place within the reactor assembly 114 in the given order, resulting in the generation of the syngas which then exits the reactor assembly 114 and is introduced into the cooler 116 positioned downstream of the reactor assembly 114. The syngas is further introduced into the engine 104 to maintain combustion stability in the lean burn engine system while maintaining required NOx emission requirements.

INDUSTRIAL APPLICABILITY

The present disclosure provides the diffusion barrier coating 208 on the CPO catalyst layer 204 of the reactor assembly 114 for controlling a rate of the supply of the gas phase oxygen to the underlying CPO catalyst layer 204, thereby controlling the rate of the combustion reaction. The diffusion barrier coating 208 assists in regulating an overall temperature of the reactor assembly 114 by controlling the first temperature at the relatively hotter inlet face 120 of the reactor assembly 114 with respect to the second temperature at the outlet face 122 of the reactor assembly 114.

By controlling the first temperature with respect to the second temperature, a temperature gradient across the length L of the reactor assembly 114 may be regulated causing uniform aging of the reactor assembly 114. The diffusion barrier coating 208 is a low cost solution that may increase durability and life of the reactor assembly 114. Further, the diffusion barrier coating 208 may also increase tolerance and robustness of the reactor assembly 114 with respect to sulfur. The diffusion barrier coating 208 is effective in controlling the temperature of the reactor assembly 114 both in the presence and absence of sulfur in the inlet stream.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:
1. A reactor assembly comprising:
a substrate;

a first catalytic layer provided on the substrate, wherein the first catalytic layer further includes:
  a first temperature zone configured to operate at a first temperature; and
  a second temperature zone extending from the first temperature zone, the second temperature zone configured to operate at a second temperature, wherein the second temperature is lower than the first temperature; and
a diffusion barrier coating provided on the first catalytic layer, the diffusion barrier coating configured to regulate a diffusion of gas phase oxygen therethrough for controlling the first temperature with respect to the second temperature.

2. The reactor assembly of claim 1, wherein the first catalytic layer is configured to perform catalytic partial oxidation and steam reforming reactions.

3. The reactor assembly of claim 1 further including a second catalytic layer, wherein the first catalytic layer is a catalytic partial oxidation catalyst layer and the second catalytic layer is a steam reforming catalyst layer, the second catalytic layer lies between the first catalytic layer and the substrate.

4. The reactor assembly of claim 3, wherein the catalytic partial oxidation catalyst layer is a dispersed rhodium containing catalyst layer.

5. The reactor assembly of claim 1, wherein the diffusion barrier coating is present on half of a total length of the reactor assembly.

6. The reactor assembly of claim 1, wherein the diffusion barrier coating lies between one third and half of an overall length of the reactor assembly.

7. The reactor assembly of claim 1, wherein the diffusion barrier coating is applied as a washcoat above and in contact with the first catalytic layer such that the diffusion barrier coating is configured to receive an inlet stream thereon, the inlet stream including hydrocarbon, steam, and air.

8. The reactor assembly of claim 1, wherein the diffusion barrier coating is a porous ceramic layer.

9. The reactor assembly of claim 1, wherein a thickness of the diffusion barrier coating lies between 20% and 150% of a thickness of the first catalytic layer.

10. The reactor assembly of claim 1, wherein the diffusion barrier layer comprises alumina, silica, zirconia, titania, or a combination thereof.

* * * * *